US012739270B2

(12) United States Patent
Childress et al.

(10) Patent No.: US 12,739,270 B2
(45) Date of Patent: Sep. 15, 2026

(54) INTELLIGENT WORKFLOW FOR PROTECTING SERVERS FROM OUTSIDE THREATS

(71) Applicant: Kyndryl, Inc., New York, NY (US)

(72) Inventors: Rhonda L. Childress, Austin, TX (US); Jeremy R. Fox, Georgetown, TX (US); Michael Bender, Rye Brook, NY (US)

(73) Assignee: Kyndryl, Inc., New York, NY (US)

( * ) Notice: Subject to any disclaimer, the term of this patent is extended or adjusted under 35 U.S.C. 154(b) by 292 days.

(21) Appl. No.: 17/665,114

(22) Filed: Feb. 4, 2022

(65) Prior Publication Data

US 2023/0254334 A1 Aug. 10, 2023

(51) Int. Cl.

*H04L 9/40* (2022.01)
*G06N 20/00* (2019.01)

(52) U.S. Cl.

CPC ......... *H04L 63/1433* (2013.01); *G06N 20/00* (2019.01); *H04L 63/0876* (2013.01); *H04L 63/1416* (2013.01); *H04L 63/1425* (2013.01); *H04L 63/1466* (2013.01)

(58) Field of Classification Search

None

See application file for complete search history.

(56) References Cited

U.S. PATENT DOCUMENTS 8,880,893 B2 11/2014 Moghe et al.
9,462,010 B1 * 10/2016 Stevenson ............... H04L 67/10
9,978,067 B1 * 5/2018 Sadaghiani ......... H04L 63/1416
10,104,527 B1 * 10/2018 Keil .................... H04W 68/005
10,438,200 B1 * 10/2019 Griffith ............... H04L 63/0853
10,528,728 B2 1/2020 Bender et al.
11,824,885 B1 * 11/2023 Belton, Jr. .......... H04L 63/1441
2011/0078797 A1 3/2011 Beachem et al.
2014/0082693 A1 * 3/2014 Wackerly ............ H04L 63/1466 726/3
2016/0292599 A1 10/2016 Andrews et al.
2017/0078317 A1 3/2017 Gertner et al.
2018/0025163 A1 1/2018 Bahl
2018/0077188 A1 * 3/2018 Mandyam ........... H04L 63/1433
2020/0012802 A1 1/2020 Kannan
2020/0076910 A1 * 3/2020 Kuperman ............. H04W 4/00

(Continued)

FOREIGN PATENT DOCUMENTS

EP 2180656 4/2010

OTHER PUBLICATIONS

Mell et al., "The NIST Definition of Cloud Computing", NIST, Special Publication 800-145, Sep. 2011, 7 pages.

(Continued)

*Primary Examiner* — Bassam A Noaman

(74) *Attorney, Agent, or Firm* — Erik Swanson; Andrew D. Wright; Calderon Safran & Wright P.C.

(57) ABSTRACT

A computer-implemented method includes: monitoring, by a computing device, network communications to a server; determining, by the computing device, a threat to the server based on the monitoring; determining, by the computing device, a risk level of the threat; selecting, by the computing device, a response to the threat based on the determined risk level, wherein the response is selected from a predefined set of responses; initiating, by the computing device, the selected response.

20 Claims, 6 Drawing Sheets

(56) References Cited

U.S. PATENT DOCUMENTS

2020/0137114 A1 4/2020 Bender et al.
2020/0213329 A1* 7/2020 Simons .................. G06F 21/33
2020/0314134 A1* 10/2020 Izrael .................. H04L 63/1425
2020/0366682 A1* 11/2020 Aggarwal ............. H04L 63/105
2021/0014256 A1 1/2021 Malhotra
2021/0135943 A1* 5/2021 Andrews ................ H04L 63/20
2021/0243595 A1* 8/2021 Buck ...................... H04L 63/20
2023/0105021 A1* 4/2023 Shah .................... H04L 41/145
726/11

OTHER PUBLICATIONS

Anonymous, "What Is Network Traffic Analysis?", https://www.cisco.com/c/en/us/products/security/what-is-network-traffic-analysis.html, accessed Feb. 4, 2022, 3 pages.
Oltsik, "SIEM and NDR: Better Together", ESG White Paper, Feb. 2021, 10 pages.
Anonymous, "Server security", https://www.nibusinessinfo.co.uk/content/server-security, accessed Jan. 17, 2022, 3 pages.

* cited by examiner

INTELLIGENT WORKFLOW FOR PROTECTING SERVERS FROM OUTSIDE THREATS

BACKGROUND

Aspects of the present invention relate generally to computer security and, more particularly, to an intelligent workflow for protecting servers from outside threats.

Servers provide one or more services (such as email, web, or file servers) to users on a particular network. Server security focuses on the protection of data and resources held on the servers. It comprises tools and techniques that help prevent intrusions, hacking, and other malicious actions.

SUMMARY

In a first aspect of the invention, there is a computer-implemented method including: monitoring, by a computing device, network communications to a server; determining, by the computing device, a threat to the server based on the monitoring; determining, by the computing device, a risk level of the threat; selecting, by the computing device, a response to the threat based on the determined risk level, wherein the response is selected from a predefined set of responses; initiating, by the computing device, the selected response.

In another aspect of the invention, there is a computer program product including one or more computer readable storage media having program instructions collectively stored on the one or more computer readable storage media. The program instructions are executable to: monitor network communications to a server; determine a threat to the server based on the monitoring; determine a risk level of the threat; select a response to the threat based on the determined risk level, wherein the response is selected from a predefined set of responses comprising: blocking network communication to the server; switching the server to a different network; and sending network communications to a device associated with the threat; and initiate the selected response.

In another aspect of the invention, there is system including a processor, a computer readable memory, one or more computer readable storage media, and program instructions collectively stored on the one or more computer readable storage media. The program instructions are executable to: monitor network communications to a server; determine a threat to the server based on the monitoring; determine a risk level of the threat; select a response to the threat based on the determined risk level, wherein the response is selected from a predefined set of responses comprising: blocking network communication to the server; switching the server to a different network; and sending network communications to a device associated with the threat; and initiate the selected response.

BRIEF DESCRIPTION OF THE DRAWINGS

Aspects of the present invention are described in the detailed description which follows, in reference to the noted plurality of drawings by way of non-limiting examples of exemplary embodiments of the present invention.

DETAILED DESCRIPTION

Figure 1:
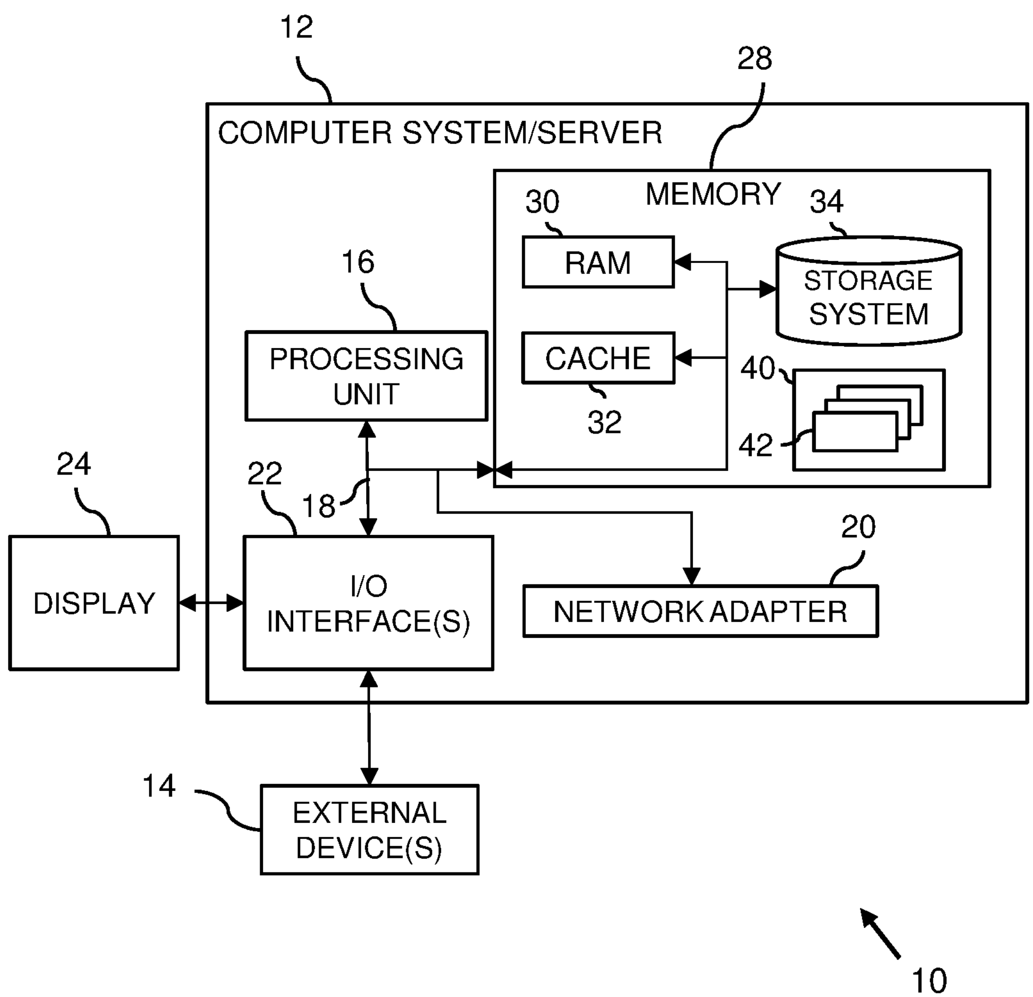
FIG. 1 depicts a cloud computing node according to an embodiment of the present invention.

Aspects of the present invention relate generally to computer security and, more particularly, to an intelligent workflow for protecting servers from outside threats. Implementations of the invention identify active and potential risks to a server and determine how to respond to that risk. Embodiments comprise risk-based decision response triggering actions defined based on situational environments and hybrid response ameliorations. In this manner, implementations of the invention provide improvements in the technical field of computer security.

Servers can be exposed to risk from outside and internal threats. There are also different ways of reacting to threats. This disclosure describes a method of monitoring servers based on identified attacks or risk of attack, where the risk of attack is based on the security standards that are in place for servers that have access to the monitored server. In embodiments, once a server is determined to be at risk, the system can hide, run, or reply to the potential threat. In accordance with aspects of the invention, the response determination is based on the risk level, based on how the risk was identified, and the risk to the business based on the server capabilities.

In embodiments, a system takes plural factors into account when identifying threats to a monitored server. One factor may be a risk to the monitored server from access by non-compliant computing devices. For example, the monitored server may enable other devices to access to data stored on the monitored server, and the system monitors for such other devices that do not comply with identified security standards. Another factor may be a risk to the monitored server based on non-standard transaction volumes. For example, the system may analyze (e.g., using cognitive analysis) sources of communication to the server based on IP/MAC addresses, and use this analysis to determine whether devices (e.g., IoT devices) sending data to the monitored server are still broadcasting at traditional volumes. Another factor may be a risk to the monitored server based on a source of data that is being transmitted to the server. For example, the system may monitor network traffic to determine whether a device transmitting data to the monitored server is a known device or an unknown/untrusted device. In embodiments, based on these factors, the system may respond to a threat by performing one of: hiding (e.g., turning off all or select access to the monitored server); running (e.g., connecting the monitored server through an alternate network); and replying (e.g., flooding the source of the attack).

As will be understood from the description herein, aspects of the invention may be used to provide a method for protecting servers from threats, the method comprising: monitoring a group of servers for attacks (actual or potential); in response to identifying an attack on a server, determining a risk level associated with the attack; and determining a response to the attack based on the risk level: for a high risk level, turn off the server; for a moderate risk level, disconnect the server from a current network and connect to a different network; and for a low risk level, perform an offensive action against a source of the attack (e.g., flood the source with large amounts of data).

Implementations of the invention provide an improvement in the technical field of computer security by automatically selecting and initiating a response to a determined threat to a server, where the response is selected from different available responses based on a risk level associated with the threat. Typical automated responses are one-size-fits-all. However, a one-size-fits-all approach is inefficient when the one-size-fits-all response is too much in some situations. Moreover, a one-size-fits-all approach is ineffective when the one-size-fits-all response is too little in other situations. Manual responses to a threat (e.g., as applied by a human user such as an administrator) may be specifically tailored to the threat, but take far more time to implement (e.g., hours or even days) compared to the automated responses described herein. Implementations of the invention also utilize technology that can only be performed using a machine (e.g., monitoring network communications using network traffic analysis) and that cannot be performed in the human.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium or media, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
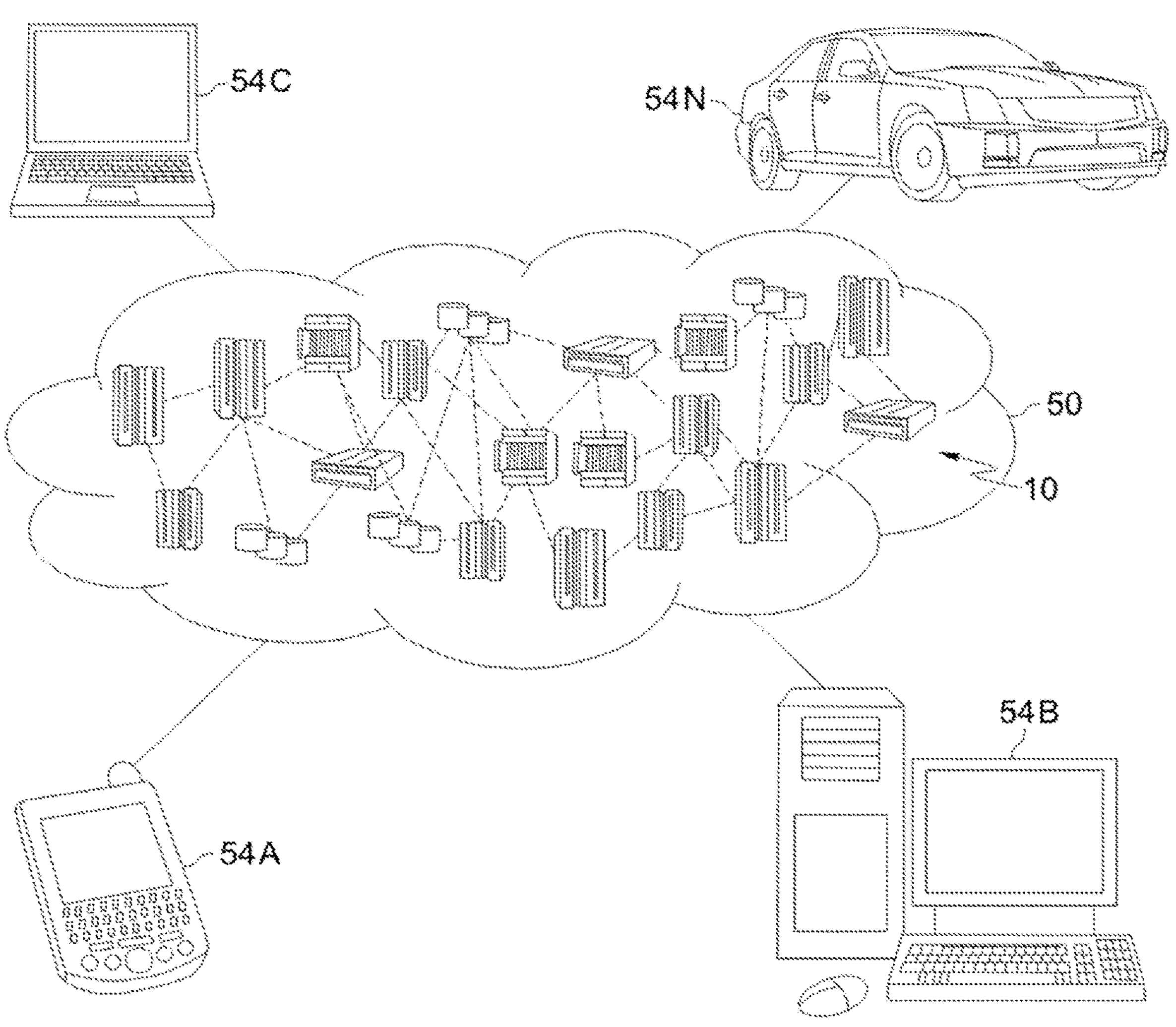
FIG. 2 depicts a cloud computing environment according to an embodiment of the present invention.

Referring now to FIG. 2, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
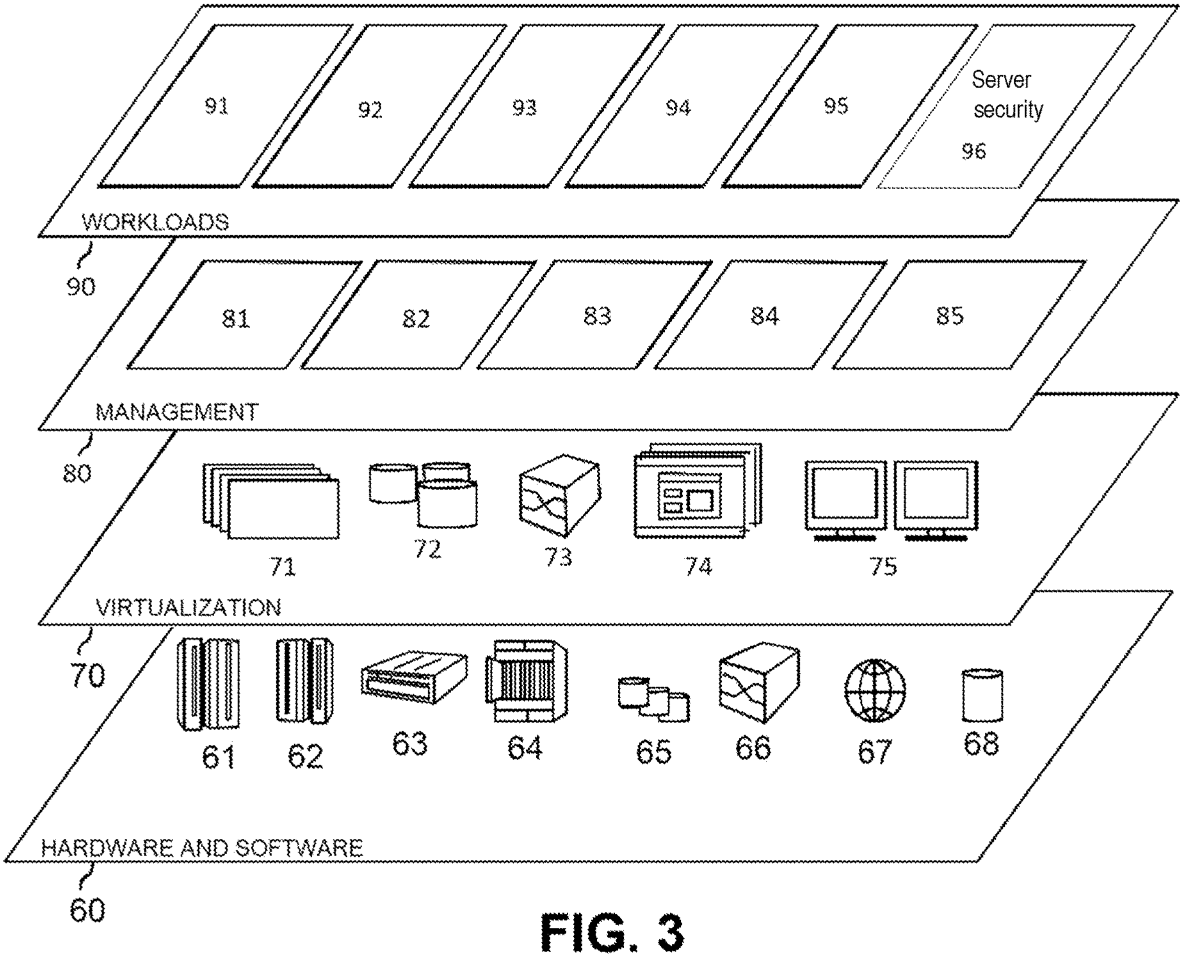
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and server security 96.

Implementations of the invention may include a computer system/server 12 of FIG. 1 in which one or more of the program modules 42 are configured to perform (or cause the computer system/server 12 to perform) one of more functions of the server security 96 of FIG. 3. For example, the one or more of the program modules 42 may be configured to: monitor network communications to a server; determine a threat to the server based on the monitoring; determine a risk level of the threat; select a response to the threat based on the determined risk level, wherein the response is selected from a predefined set of responses comprising: blocking network communication to the server; switching the server to a different network; and sending network communications to a device associated with the threat; and initiate the selected response.

Figure 4:
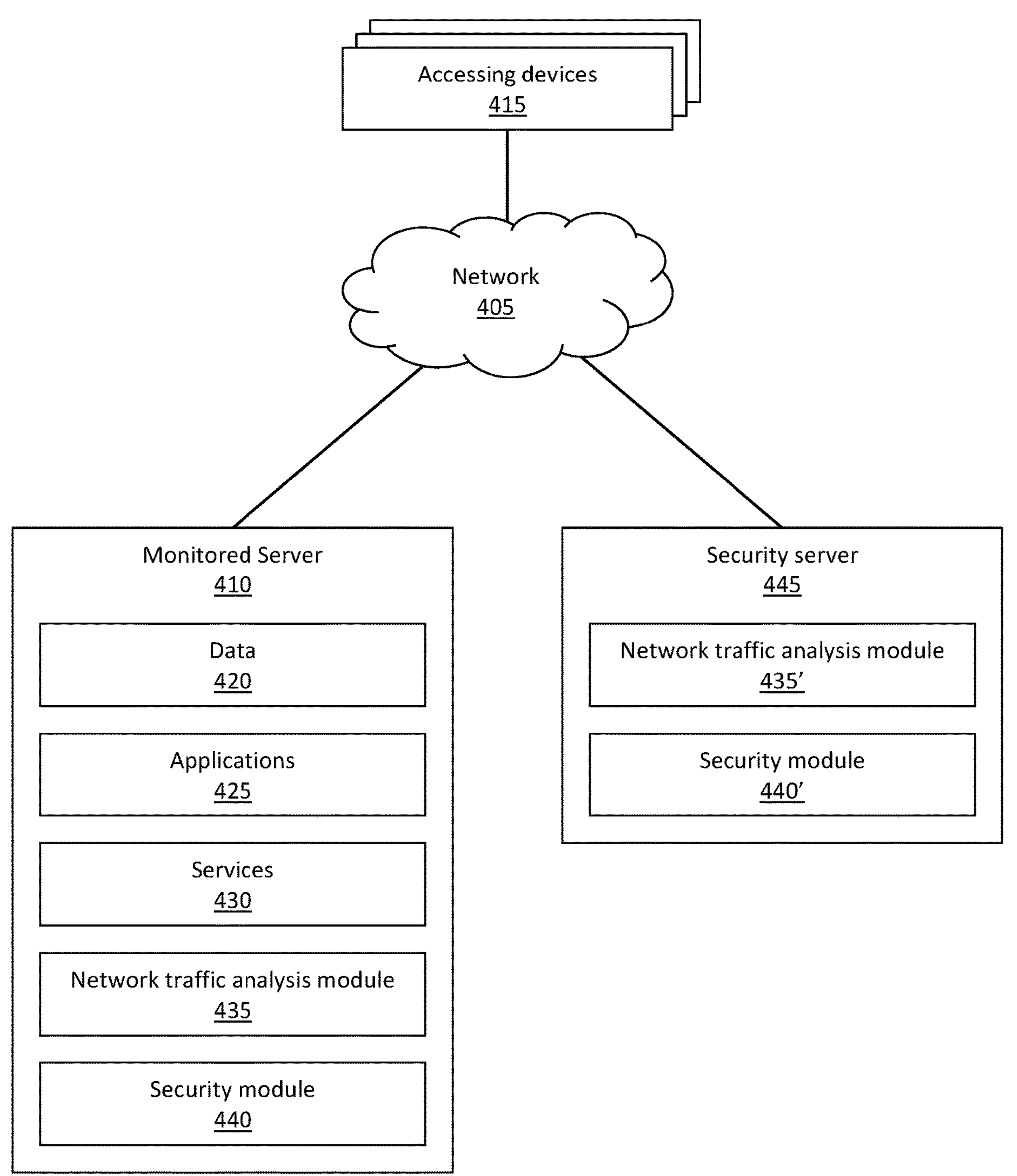
FIG. 4 shows a block diagram of an exemplary environment in accordance with aspects of the invention.

FIG. 4 shows a block diagram of an exemplary environment in accordance with aspects of the invention. In embodiments, the environment includes a network 405 providing communication between a monitored server 410 and plural accessing devices 415. The network 405 comprises one or more communication networks, such as one or more of a LAN, WAN, and the Internet and combinations thereof. The monitored server 410 (referred to herein as server 410) is a computing server that includes one or more elements of computer system 12 of FIG. 1 and that serves content to the accessing devices 415. The content can include one or more of data 420, applications 425, and services 430, each of which may be stored on the server 410 or at another network device (e.g., a cloud storage device, etc.) that is accessible by the server 410. The accessing devices 415 may comprise any type of computing device that accesses the server 410, and can include for example personal devices (e.g., smartphone, tablet computer, laptop computer, desktop computer, etc.), Internet of Things (IoT) devices (e.g., smart sensors, smart appliances, etc.), and other servers (e.g., other networked computing servers), for example.

In embodiments, the server 410 comprises a network traffic analysis module 435 and a security module 440, each of which may comprise one or more program modules such as program modules 42 described with respect to FIG. 1. The server 410 may include additional or fewer modules than those shown in FIG. 4. In embodiments, separate modules may be integrated into a single module. Additionally, or alternatively, a single module may be implemented as multiple modules. Moreover, the quantity of devices and/or networks in the environment is not limited to what is shown in FIG. 4. In practice, the environment may include additional devices and/or networks; fewer devices and/or networks; different devices and/or networks; or differently arranged devices and/or networks than illustrated in FIG. 4.

In a cloud implementation, the network 405 is a cloud computing environment 50 of FIG. 2, the server 410 is a cloud computing node 10 of FIG. 2, and the devices 415 are local computing devices 54A-N of FIG. 2. The network traffic analysis module 435 and security module 440 may be stored and run on the server 410, or may be stored and run on another cloud computing node 10 that monitors the server 410 (e.g., as shown at 435' and 440' on security server 445).

In accordance with aspects of the invention, the network traffic analysis module 435 is configured to continuously analyze network telemetry and/or flow records of network traffic to and from the server 410. Network traffic analysis is a computer-based method of monitoring network availability and activity to identify anomalies including security and operational issues. Network traffic analysis may be used to collect a real-time and a historical record or what is happening on the network, detect malware such as ransomware activity, and see what devices are talking to the server 410. For example, the network traffic analysis module 435 may monitor network flows, packets, and metadata associated with all communications to and from the server 410 via the network 405. In embodiments, based on monitoring this communication data for the server 410 over a period of time, the network traffic analysis module 435 uses a combination of machine learning and behavioral analytics to generate one or more baselines that reflect what normal network behavior looks like for the server 410. When abnormal traffic patterns or irregular network activities are detected, the network traffic analysis module 435 alerts the security module 440 to the potential threat. For example, by comparing real-time network communication data for the server 410 to the determined baseline(s) for the server 410, the network traffic analysis module 435 may identify anomalous/suspicious network behaviors like port scanning, lateral movement, data exfiltration, or connections to malicious IP addresses.

In accordance with aspects of the invention, the security module 440 is configured to determine a risk level based on data from the network traffic analysis module 435 and determine a response. In embodiments, the security module 440 receives an alert from the network traffic analysis module 435, the alert indicating a threat to the server 410 based on the network analysis performed by the network traffic analysis module 435. In embodiments, the security module 440 determines a risk level associated with the threat based on one or more of: risk from non-standard transaction volumes; risk from non-compliant devices; and risk from unknown/untrusted devices. In embodiments, the security module 440 determines a response to the potential threat based on the determined risk level. The response may include one of: hiding (e.g., turning off all or select access to the server 410); running (e.g., connecting the server 410 through an alternate network); and responding (e.g., flooding the source of the attack, e.g., one of the devices 415).

Figure 5:
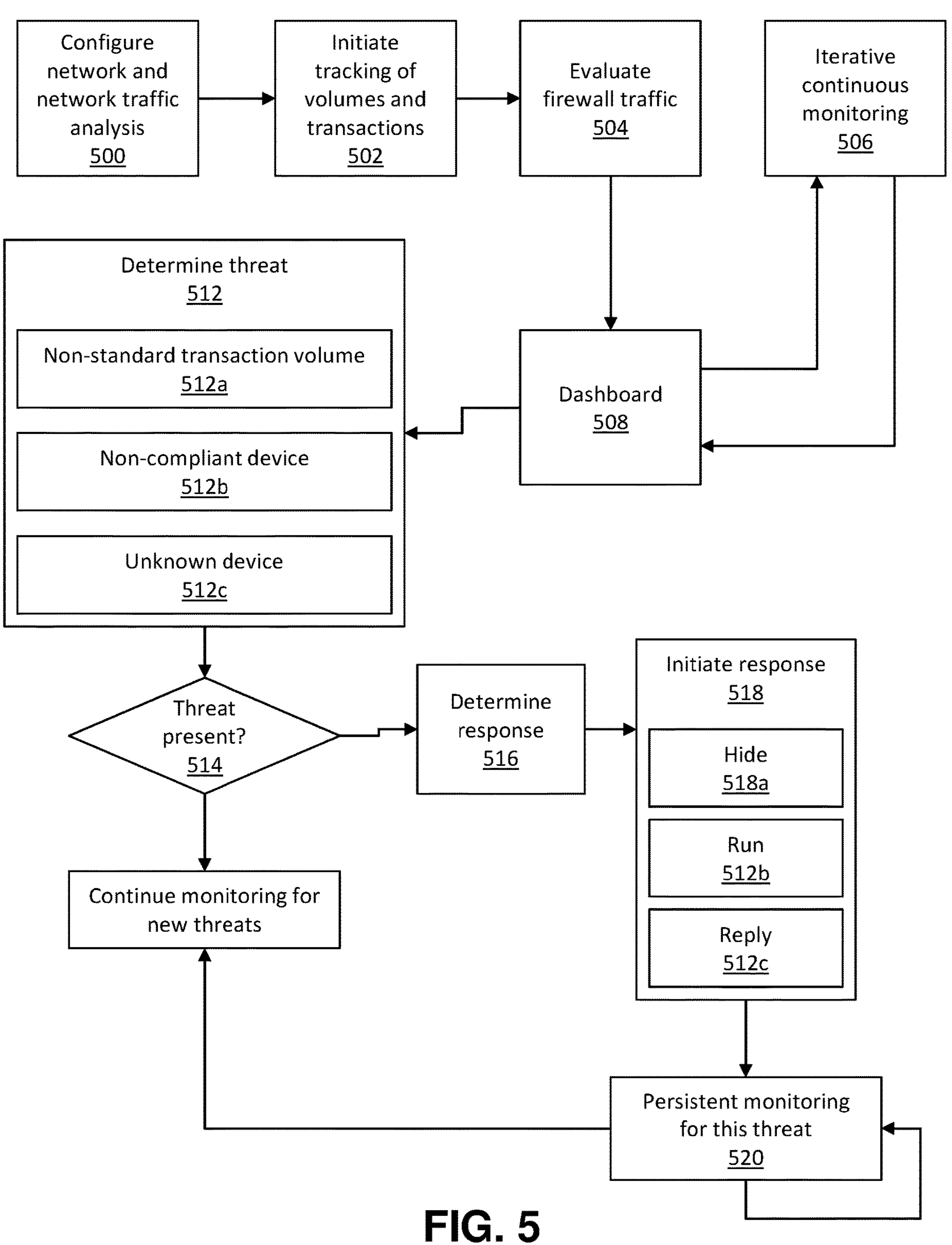
FIG. 5 shows a functional block diagram of an implementation of the invention.

FIG. 5 shows a functional block diagram of an implementation of the invention. Functions described in FIG. 5 may be carried out in the environment of FIG. 4 and are described with reference to elements depicted in FIG. 4.

At step 500, an administrator configures the network and network traffic analysis for monitoring the server 410. This may include establishing the server 410 in the network 405 and configuring the network traffic analysis module 435 to monitor network traffic to and from the server 410 via the network 405. Step 500 may include the administrator opting the server 410 in to being monitored by the network traffic analysis module 435.

Step 502 includes initiating tracking of volumes and transactions. In embodiments, the network traffic analysis module 435 begins tracking volumes of data communicated to and from the server 410 and network transactions that involve the server 410. The system may collect and present transaction data in a dashboard (e.g., a transaction summary dashboard) that includes one or more visualizations of transaction data, which provides a user with tools to analyze the status of transactions for selected applications 425 over a selected history/time period. This may be useful, for example, to identify poor performing transactions. In embodiments, the network traffic analysis module 435 is configured to collect and visualize user and session counts on the dashboard, which can be useful to identify the poorest performing devices 415. For example, the network traffic analysis module 435 may include or utilize IBM® Performance Management, which is software that provides a user with visibility, control, and automation of applications such as applications 425 on the server 410. (IBM is a trademark of International Business Machines Corporation in the United States and other countries.) In embodiments, the network traffic analysis module 435 includes an agent that obtains data for the dashboard. For example, the network traffic analysis module 435 may include or utilize IBM® Response Time Monitoring agent, which is software that monitors HTTP and HTTPS transactions on a server such as server 410. In embodiments, the agent also monitors real browser-based user transactions (browser timings) involving the server 410.

Step 504 includes evaluating firewall traffic of the server 410. In embodiments, the network traffic analysis module 435 monitors firewall traffic to and from the server 410 to determine if the server 410 has network traffic with unknown devices, such as devices 415 with which the server 410 has never communicated. The unknown devices may include devices on an internal network (e.g., intranet) with the server 410. The unknown devices may include devices on an external network (e.g., Internet). Step 504 may include evaluating the firewall traffic for any anomalies that may be used in determining which response to take.

Step 506 represents iterative and continuous monitoring of the network traffic of the server 410. In embodiments, the network traffic analysis module 435 continuously monitors the network traffic of the server 410, including the tracking of volumes and transactions described at step 502 and the evaluating firewall traffic described at step 504.

Step 508 represents establishing the dashboard described at step 502. In embodiments, the network traffic analysis module 435 generates a dashboard including visualizations of aspects of the network traffic associated with the server 410. An administrator or other user may access and configure the dashboard via their computing device.

At step 512, the network traffic analysis module 435 determines a threat to the server 410 based on the monitoring at step 506. In embodiments, step 512 includes three components used in determining a threat: threat from non-standard transaction volumes at step 512*a*; threat from access by non-compliant devices at step 512*b*; and threat from unknown or untrusted devices at step 512*c*.

In embodiments, the network traffic analysis module 435 determines a threat from non-standard transaction volumes at step 512*a* by comparing real time transaction volumes to predefined thresholds. In embodiments, the network traffic analysis module 435 uses machine learning and analytics to define thresholds at upper limit boundaries on security protocols pertaining to normal/standard transaction volumes. For example, the network traffic analysis module 435 may use machine learning to analyze historic transaction volume data of the server 410, where the machine learning analysis is configured to determine a pattern that represents the upper limit of a transaction volume threshold. Different thresholds may be determined in this manner for different ones of the applications 425, different portions of the data 420, and different ones of the services 430. For example, using machine learning analysis of historic transaction data for one of the applications 425 (e.g., a video download application), the network traffic analysis module 435 may determine that this application requires relatively high volumes of data during each transaction, and the transaction volume threshold for this application would be relatively high. Conversely, using machine learning analysis of historic transaction data for another one of the applications 425 (e.g., a user authentication application), the network traffic analysis module 435 may determine that this application utilizes relative low volumes of data during each transaction, and the transaction volume threshold for this application would be relatively low.

Still referring to step 512*a*, the network traffic analysis module 435 monitors the traffic to the from the server 410 and identifies a threat when a transaction has a volume that exceeds an applicable threshold. As described above, different thresholds may be defined for different types of transactions with the server 410, and in embodiments the network traffic analysis module 435 determines the type of transaction, determines one or more thresholds that apply to the determined type of transaction, and determines whether the volume of data of the transaction exceeds any of the determined thresholds. In this manner, the triggering is configured for each situation, based on the normal typical volumes and what is considered excessive for non-standard transaction volumes.

In embodiments, the network traffic analysis module 435 determines a threat from access by a non-compliant device at step 512*b* by comparing security software of the device to predefined standards. In embodiments, for a particular transaction between the server 410 and one of the devices 415, the network traffic analysis module 435 determines whether the device 415 is compliant with applicable security protocols, such as current versions of software (e.g., operating system), updates, patches, etc. In embodiments, the network traffic analysis module 435 obtains system information from the accessing device 415 and compares the system information to information that defines applicable security protocols for a type of device defined for the accessing device 415. In embodiments, the network traffic analysis module 435 may require the accessing device 415 to provide the system information or else terminate the transaction with the server 410. In some embodiments, the system quantifies different levels of risk for different versions of software, updates, and patches of the accessing device 415. For example, the accessing device 415 running an operating system that is so old that it is no longer supported by the operating system creator may be quantified as a high risk, the accessing device 415 running an operating system that is a current version but that is missing one or more security patches may be quantified as a medium risk, and the accessing device 415 running an operating system that is a current and has all updates may be quantified as no risk. Aspects of the invention are not limited to qualifications of medium and high, and different quantifications may be used.

In embodiments, the network traffic analysis module 435 determines a threat from an unknown device at step 512*c* by comparing the identify and/or location of the accessing device 415 to a list of known devices and a list of known locations. The list of known devices may include, for example, media access control addresses (MAC addresses) of devices that are registered with the server 410 and thus are known and trusted by the server 410. The list of known locations may include Internet Protocol addresses (IP addresses) that are registered with the server 410 and thus are known and trusted by the server 410. For example, IP addresses may be used to identify transactions that originate from a device in a geographic region in which the owner of the server 410 does not do business, which can be indicative of a threat. As another example, MAC addresses can be used to identify transactions with a device 415 with which the server 410 has never previously communicated, which can be indicative of a threat. In embodiments, for a particular transaction between the server 410 and one of the devices 415, the network traffic analysis module 435 may require the accessing device 415 to provide its MAC address and IP address or else terminate the transaction with the server 410.

At step 514, the system determines whether there is a threat present with the current transaction that requires action. In embodiments, the network traffic analysis module 435 determines a threat and requires action when any one or more of the following conditions is met: the transaction volume exceeds a threshold (e.g., as determined at step 512*a*); the accessing device has a non-compliance quantification greater than zero/no risk (e.g., as determined at step 512*b*); and one or both the MAC address and IP address are unknown (e.g., as determined as step 512*c*). If any one or more of these conditions is satisfied, then the process proceeds to step 516. If none of these conditions is satisfied, then the process returns to step 506 where the network traffic analysis module 435 continues to monitor transactions between devices 415 and the server 410.

At step 516, the security module 440 determines an automated response to the risk associated with the transaction as determined at step 512. In embodiments, the security module 440 determines the automated response based on a determined risk level, e.g., low risk level, medium risk level, and high risk level. In embodiments, the security module 440 determines the risk level based on the type of threat, e.g., transaction volume exceeds a threshold, non-compliant device, or unknown device. In some embodiments, the security module 440 determines the risk level based on the type of threat and a value of data stored on the server 410. In one example, the security module 440 selects a response from a predefined set of responses including: blocking some or all network communication to the server 410 (e.g., hiding); switching the server 410 to a different network (e.g., running); and sending network communications to the device 415 associated with the threat (e.g., responding).

In an example of the security module 440 determining the risk level based on the type of threat, the security module 440 determines the risk level as low based on the type of threat being a transaction volume exceeds a threshold (e.g., as determined at step 512*a*). In this example, the security module 440 determines the risk level as medium based on the type of threat being an unknown device (e.g., the accessing device 415 has an unknown MAC address or an unknown IP address as determined at step 512*c*). In this example, the security module 440 determines the risk level as high based the type of threat being a non-compliant device (e.g., as determined at step 512*b*).

These determined threats, risk levels, and responses are illustrated by the following exemplary use cases. In a first use case, an enterprise human resources server (e.g., server 410) stores employee personal information (e.g., data 420). The human resources server knows and trusts a payroll server (e.g., device 415) in the same enterprise. However, although access to the human resources server has been given to the payroll server, the system determines that the payroll server does not have all of the security patches required by corporate guidance. The system thus determines a threat to the human resources server from a non-compliant device (e.g., the payroll server). In this exemplary use case, the system 'hides' by adjusting the firewall of the human resources server to block all communications from the payroll server until the payroll server is compliant (e.g., the missing security patches are applied to the payroll server).

In a second use case, IoT devices (e.g., device 415) on delivery trucks are sending GPS data in real time to a supply chain server (e.g., server 410). While multiple feeds are coming in with different locations, the system determines that there is new data coming from an unauthorized secondary source (e.g., another device 415) with an unknown address (IP or MAC). In this exemplary use case, the system 'runs' by moving the communications between the known IoT device and the supply chain server to a different network and disables the previous path so the transactional information from the unauthorized access is disabled.

In a third use case, a system (e.g., server 410) with low value data is being attacked by a device (e.g., device 415) sending large amounts of data that exceed a predefined threshold. In this exemplary use case, the system 'replies' by sending large volumes of data back to the source while it initiates transferring to a secondary network.

In an example of the security module 440 determining the risk level based on the type of threat and a value of data stored on the server 410, the security module 440 determines an initial risk level based on the type of threat and then determines a final risk level by either maintaining or increasing the initial risk level based on the value of data stored on the server 410. In embodiments, the data 420 stored on the server 410 is predefined as low value or high value. For example, personal information (PI) and financial records (e.g., bank account data) may be defined as high value data, whereas publicly available information may be defined as low value data. In this example, when the data is low value data, the security module 440 determines the final risk level as the initial risk level (e.g., the risk level is maintained at its initial level due to the relatively low value of the data). In this example, when the data is high value data, the security module 440 determines the final risk level as the initial risk level increased by one level (e.g., the risk level is increased from its initial level due to the relatively high value of the data). In this example, if the security module 440 determines the initial risk level as low based on the type of threat being transaction volume exceeds a threshold (e.g., as determined at step 512*a*) and the value of the data is defined as low, then the final risk level is maintained at low. However, if the security module 440 determines the initial risk level as low based on the type of threat being transaction volume exceeds a threshold (e.g., as determined at step 512*a*) and the value of the data is defined as high, then the final risk level is increased from low to medium. Similarly, if the security module 440 determines the initial risk level as medium based on the type of threat being an unknown device (e.g., as determined at step 512*c*) and the value of the data is defined as low, then the final risk level is maintained at medium. However, if the security module 440 determines the initial risk level as medium based on the type of threat being an unknown device (e.g., as determined at step 512*c*) and the value of the data is defined as high, then the final risk level is increased from medium to high. In this example, if the security module 440 determines the initial risk level as high based on the type of threat being a non-compliant device (e.g., as determined at step 512*b*) the risk level is high for both low value data and high value data.

At step 518, the system initiates the response that was selected at step 516. If the selected response is to hide, then at step 518*a* the security module 440 may automatically configures a firewall to block all network communications between the server 410 and the device 415 associated with the threat. If the selected response is to run, then at step 518*b* the security module 440 may automatically reconfigure a new network connection for the server 410, e.g., using a different IP address for the server 410. If the selected response is to reply, then at step 518*c* the security module 440 may automatically transmit plural network communications to the device 415 associated with the threat (e.g., the device 415 that sent the initial network communication that resulted in the threat to the server 410).

At step 520, the system performs persistent monitoring after initiating the response of step 518. In embodiments, the security module 440 coordinates with the network traffic analysis module 435 to determine whether to continue the response of step 518, discontinue the response of step 518, or modify the response of step 518 by applying a hybrid response. In one example, the response at step 518 is to 'hide' based on communications from a non-compliant device, and the system may determine at step 520 to continue the response based on determining that the non-compliant device is still non-compliant (e.g., still does not have all the required security software). In another example, the response at step 518 is to 'hide' based on communications from a non-compliant device, and the system may determine at step 520 to discontinue the response upon determining that the non-compliant device is now a compliant device (e.g., now has all the required security software). In another example, the response at step 518 is to 'reply' based on receiving high volume transactions from a device, and the system may determine at step 520 to discontinue this response and switch to 'hiding' because the device is still sending high volume transactions to the server. Other types of hybrid responses may also be used.

Figure 6:
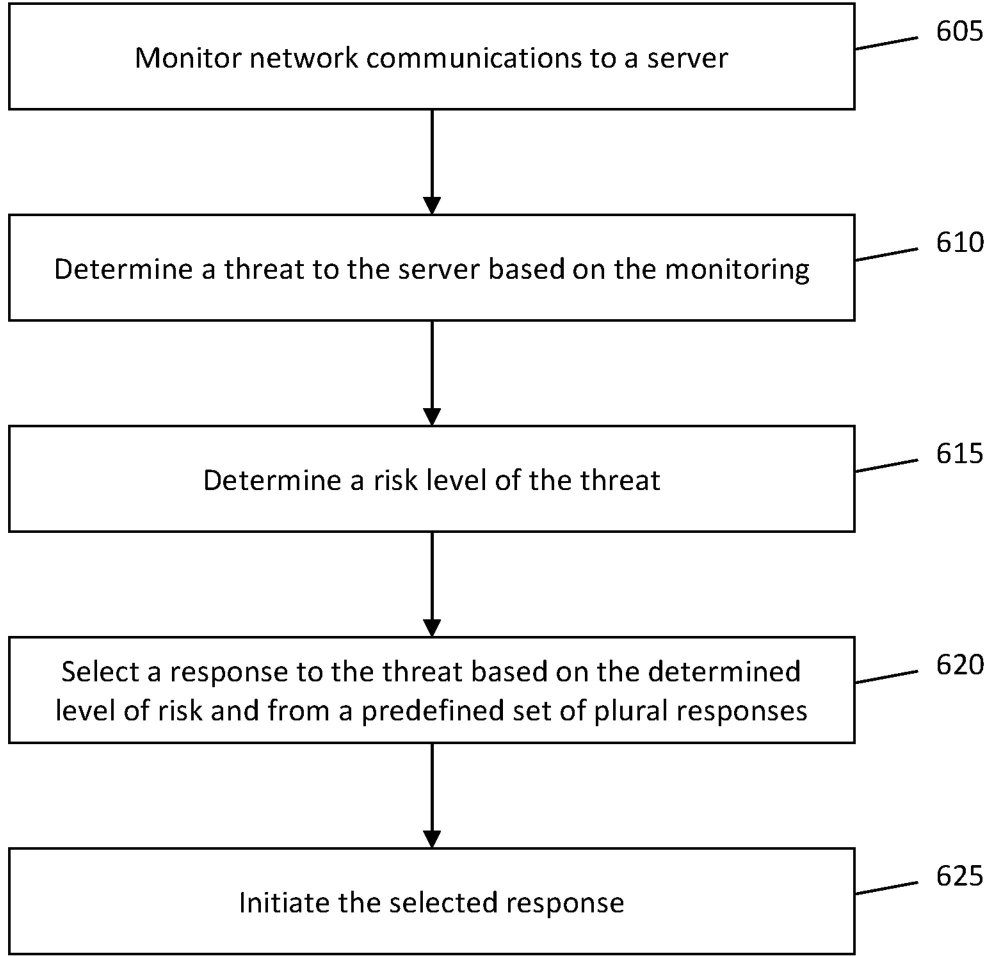
FIG. 6 shows a flowchart of an exemplary method in accordance with aspects of the invention.

FIG. 6 shows a flowchart of an exemplary method in accordance with aspects of the present invention. Steps of the method may be carried out in the environment of FIG. 4 and are described with reference to elements depicted in FIG. 4.

At step 605, the system monitors network communications to a server. In embodiments, and as described with respect to FIGS. 4 and 5, the network traffic analysis module 435 monitors traffic from devices 415 to server 410.

At step 610, the system determines a threat to the server based on the monitoring. In embodiments, and as described with respect to FIGS. 4 and 5, the network traffic analysis module 435 determines a threat to the server 410 based on one or more of: a transaction volume from the device 415 to the server 410 exceeds a predefined threshold; the device 415 is a non-compliant device; and the device 415 is an unknown device.

At step 615, the system determines a risk level of the threat. In embodiments, and as described with respect to FIGS. 4 and 5, the network traffic analysis module 435 determines a risk level (e.g., low, medium, high) based on the type of threat (e.g., transaction volume exceeds a predefined threshold; non-compliant device; and unknown device). In another embodiment, the network traffic analysis module 435 determines a risk level (e.g., low, medium, high) based on the type of threat (e.g., transaction volume exceeds a predefined threshold; non-compliant device; and unknown device) and a predefined value of data stored at the server 410 (e.g., low value or high value).

At step 620, the system selects a response to the threat based on the determined risk level and from a predefined set of responses. In embodiments, and as described with respect to FIGS. 4 and 5, the security module 440 automatically selects a response from a set consisting of: blocking all network communication to the server 410 (e.g., hiding); switching the server 410 to a different network (e.g., running); and sending network communications to the device 415 associated with the threat (e.g., replying). In embodiments, the security module 440 selects the response as: hiding based on the risk level of the threat being high; running based on the risk level being medium; and replying based on the risk level being low.

At step 625, the system initiates the response that was selected at step 620. In embodiments, and as described with respect to FIGS. 4 and 5, the security module 440 automatically initiates the selected response. For example, the security module 440 may configure a firewall to block some or all network communications the server 410. In another example, the security module 440 may reconfigure a new network connection for the server 410, e.g., using a different IP address for the server 410. In another example, the security module 440 may transmit plural network communications to the device 415 associated with the threat (e.g., the device 415 that sent the initial network communication that resulted in the threat to the server 410).

It can be understood from the foregoing description that aspects of the invention may be used to provide a computer enabled method for determining and responding to risks associated with access to a computer server, the method comprising: initiating the tracking of the usage; tracking non-standard access; tracking access from non-compliant servers; and determining a response. The method may include cognitive analysis of access patterns to the server. The method may include cognitive analysis of the server compliance level for all other servers accessing the monitored server. The method may include determining the response based on the risk level identified and the configured responses. The response may include disabling firewall access to the server. The response may include switching communications to and from the server to an alternate network. The response may include sending communications to the attacking server.

In embodiments, a service provider could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/or the service provider can receive payment from the sale of advertising content to one or more third parties.

In still additional embodiments, the invention provides a computer-implemented method, via a network. In this case, a computer infrastructure, such as computer system/server 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system/server 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, comprising: monitoring, by a computing device, network communications to a server; generating, by the computing device, a baseline network behavior for the server using machine learning and behavioral analytics of the network communications, the baseline network behavior representing normal network behavior of the server;

generating, by the computing device, visualizations of transaction data related to the monitored network communications on a dashboard to identify poorest-performing transactions in the network communications;

determining, by the computing device, a threat to the server based on the monitoring, the identified poorest-performing transactions, and the baseline network behavior for the server;

determining, by the computing device, an initial risk level of the threat based on a type of the threat, and a final risk level of the threat by maintaining or increasing the initial risk level of the threat based on a predefined value of data stored at the server, the predefined value based on classifying a level of privacy of the data;

selecting, by the computing device, a response to the threat based on the determined final risk level, wherein the response is selected from a predefined set of responses comprising: blocking network communication to the server; switching the server to a different network; and sending network communications to a device associated with the threat;

initiating, by the computing device, the selected response; and determining, through persistent monitoring, whether to continue, discontinue, or modify the selected response.

2. The method of claim 1, wherein:

blocking the network communication to the server is based on the final risk level being a first risk level;

switching the server to the different network is based on the final risk level being a second risk level that is lower than the first risk level; and sending the network communications to the device associated with the threat is based on the final risk level being a third risk level that is lower than the second risk level.

3. The method of claim 1, wherein the type of threat is one of: transaction volume exceeds a predefined threshold; non-compliant device; and unknown device.

4. The method of claim 3, further comprising determining the threshold by analyzing historic network traffic data of the server using machine learning.

5. The method of claim 4, wherein the threshold is one of plural thresholds, and further comprising determining respective ones of the plural thresholds for respective applications on the server.

6. The method of claim 3, further comprising determining a device is a non-compliant device by comparing security software of the device to predefined standards, wherein the determining that the device is a non-compliant device comprising:

obtaining system information from the device;

comparing the system information to information defining security protocols applicable for the device;

determining whether the device is compliant with the applicable security protocols; and quantifying different levels of risk for different levels of the applicable security protocols.

7. The method of claim 3, further comprising determining a device is an unknown device based on a Media Access Control (MAC) address or an Internet Protocol (IP) address of the device.

8. The method of claim 1, wherein: the type of threat is one of: transaction volume exceeds a predefined threshold; non-compliant device; and unknown device;

the data stored at the server comprises content that is served by the server to accessing devices;

the predefined value of the data stored at the server is one of a first predefined value and a second predefined value different than the first predefined value;

the final risk level is increased from the initial risk level when the predefined value of the data is determined to be the first predefined value; and the final risk level is maintained at the initial risk level when the predefined value of the data is determined to be the second predefined value.

9. The method of claim 1, wherein the monitoring comprises network traffic analysis using agentic software that monitors browser-based user transactions on the server.

10. The method of claim 1, wherein the monitoring comprises tracking of volumes and transactions and evaluating firewall traffic, and wherein the visualizations of transaction data include user counts, session counts, and status of transactions for selected applications over a selected time period.

11. A computer program product comprising one or more computer readable storage media having program instructions collectively stored on the one or more computer readable storage media, the program instructions executable to:

monitor network communications to a server;

generate a baseline network behavior for the server using machine learning and behavioral analytics of the network communications, the baseline network behavior representing normal network behavior of the server;

generate visualizations of transaction data related to the monitored network communications on a dashboard to identify poorest-performing transactions in the network communications;

determine a threat to the server based on the monitoring, the identified poorest-performing transactions, and the baseline network behavior for the server;

determine an initial risk level of the threat based on a type of the threat, and a final risk level of the threat by maintaining or increasing the initial risk level of the threat based on a predefined value of data stored at the server that is based on classifying a level of privacy of the data, the predefined value of the data being one of a first predefined value and a second predefined value different than the first predefined value;

increase the final risk level from the initial risk level when the predefined value of the data is determined to be the first predefined value;

maintain the final risk level at the initial risk level when the predefined value of the data is determined to be the second predefined value;

select a response to the threat based on the determined final risk level, wherein the response is selected from a predefined set of responses comprising:

blocking network communication to the server; switching the server to a different network; and sending network communications to a device associated with the threat; and initiate the selected response.

12. The computer program product of claim 11, wherein: the final risk level is a first risk level based on the threat being a transaction volume that exceeds a predefined threshold; the final risk level is a second risk level based on the threat being a non-compliant device; the final risk level is a third risk level based on the threat being an unknown device.

13. The computer program product of claim 12, wherein the program instructions are executable to determine the threshold by analyzing historic network traffic data of the server using machine learning.

14. The computer program product of claim 12, wherein the program instructions are executable to determine a device is a non-compliant device by comparing security software of the device to predefined standards.

15. The computer program product of claim 12, wherein the program instructions are executable to determine a device is an unknown device based on a Media Access Control (MAC) address or an Internet Protocol (IP) address of the device.

16. A system comprising: a processor, a computer readable memory, one or more computer readable storage media, and program instructions collectively stored on the one or more computer readable storage media, the program instructions executable to:

monitor network communications to a server;

generate a baseline network behavior for the server using machine learning and behavioral analytics of the network communications, the baseline network behavior representing normal network behavior of the server;

generate visualizations of transaction data related to the monitored network communications on a dashboard to identify poorest-performing transactions in the network communications;

determine a threat to the server based on the monitoring, the identified poorest-performing transactions, and the baseline network behavior for the server;

determine an initial risk level of the threat based on a type of the threat, and a final risk level of the threat by maintaining or increasing the initial risk level of the threat based on a predefined value of data stored at the server, the predefined value based on classifying a level of privacy of the data;

select a response to the threat based on the determined final risk level, wherein the response is selected from a predefined set of responses comprising: blocking network communication to the server; switching the server to a different network; and sending network communications to a device associated with the threat;

initiate the selected response; and determine, through persistent monitoring, whether to continue, discontinue, or modify the selected response.

17. The system of claim 16, wherein the program instructions are executable to: determine the threshold by analyzing historic network traffic data of the server using machine learning; determine a device is a non-compliant device by comparing current versions of an operating system, updates, and patches of the device to predefined standards; and determine a device is an unknown device based on a Media Access Control (MAC) address or an Internet Protocol (IP) address of the device.

18. The system of claim 16, wherein: the server serves plural different applications to accessing devices; the program instructions are further executable to determine a different respective threshold for each respective one of the plural different applications; and the determining the threat to the server based on the monitoring comprises determining that a transaction volume associated with one of the plural different applications exceeds the respective threshold for the one of the plural different applications.

19. The system of claim 16, wherein the program instructions are further executable to: require an accessing device to provide system information of the accessing device as part of a transaction with the server, the system information identifying current versions of an operating system, updates, and patches of the accessing device; in response to receiving the system information after requiring the accessing device to provide the system information, determine whether the accessing device is a non-compliant device by comparing the current versions of the operating system, updates, and patches of the accessing device to predefined standards; and in response to not receiving the system information after requiring the accessing device to provide the system information, terminate the transaction with the server.

20. The system of claim 16, wherein the program instructions are further executable to: require an accessing device to provide a Media Access Control (MAC) address of the accessing device and an Internet Protocol (IP) address of the accessing device as part of a transaction with the server; in response to receiving the MAC address and the IP address after requiring the accessing device to provide the MAC address and the IP address, determine whether the accessing device is an unknown device by comparing the MAC address to a list of known devices and by comparting the IP address to a list of known locations; and in response to not receiving the MAC address and the IP address after requiring the accessing device to provide the MAC address and the IP address, terminate the transaction with the server.

* * * * *